United States Patent
Park

(10) Patent No.: US 10,258,106 B2
(45) Date of Patent: Apr. 16, 2019

(54) SKIN FILM FOR UPPERS OF SHOES

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 20 days.

(21) Appl. No.: 14/941,996

(22) Filed: Nov. 16, 2015

(65) Prior Publication Data

US 2017/0112236 A1    Apr. 27, 2017

(30) Foreign Application Priority Data

Oct. 23, 2015    (KR) .................. 10-2015-0147917

(51) Int. Cl.
| | |
|---|---|
| B32B 27/30 | (2006.01) |
| B32B 27/40 | (2006.01) |
| A43B 23/02 | (2006.01) |
| A43B 3/00 | (2006.01) |

(52) U.S. Cl.
CPC ........ *A43B 23/0215* (2013.01); *A43B 3/0078* (2013.01); *A43B 23/026* (2013.01); *A43B 23/0235* (2013.01); *A43B 23/0255* (2013.01); *B32B 27/30* (2013.01); *B32B 27/306* (2013.01); *B32B 27/40* (2013.01); *B32B 2437/02* (2013.01)

(58) Field of Classification Search
CPC ............ A43B 32/0215; A43B 32/0235; A43B 32/0255; A43B 32/026; A43B 3/0078; B32B 2437/02; B32B 27/30; B32B 27/306; B32B 27/40
USPC .......................................... 428/423.3, 424.2
See application file for complete search history.

(56) References Cited

U.S. PATENT DOCUMENTS

| | | | | |
|---|---|---|---|---|
| 4,216,251 A | * | 8/1980 | Nishimura ........... | D06N 3/0077 264/135 |
| 2005/0196607 A1 | * | 9/2005 | Shih ...................... | B32B 7/12 428/354 |
| 2011/0070796 A1 | * | 3/2011 | Renzo .................. | A41D 27/245 442/183 |
| 2012/0121869 A1 | | 5/2012 | Kuwahara et al. | |
| 2012/0208031 A1 | * | 8/2012 | Park ..................... | B29B 17/0026 428/423.3 |
| 2013/0160193 A1 | * | 6/2013 | Cremin ................. | D06P 5/004 2/244 |

FOREIGN PATENT DOCUMENTS

| | | |
|---|---|---|
| JP | 5291249 B2 | 9/2013 |
| KR | 10-2001-0044753 A | 6/2001 |
| KR | 20-0286807 Y1 | 8/2002 |
| KR | 10-0865692 B1 | 10/2008 |

* cited by examiner

*Primary Examiner* — Thao T Tran
(74) *Attorney, Agent, or Firm* — Park & Associates IP Law, P. C.

(57) ABSTRACT

The present invention relates to a skin film for uppers of shoes, which includes a polyurethane skin or a thermoplastic polyurethane film having a colored layer and a thermoplastic polyurethane hot melt film. The skin film is manufactured when an ethylene vinyl alcohol copolymer is formed between the TPU film and the hot melt film. The skin film can prevent dyes of a fabric material from being transferred to the skin film when the skin film is bonded to the fabric material, thereby preventing pollution of the colored layer of the skin film.

6 Claims, 3 Drawing Sheets

SKIN FILM FOR UPPERS OF SHOES

REFERENCE TO RELATED APPLICATIONS

This application claims the priority benefit of Korean Patent Application No. 10-2015-0147917 filed on Oct. 23, 2015, the entire contents of which are incorporated herein by reference.

FIELD OF THE INVENTION

The present invention relates to a skin film for uppers of shoes, and more particularly, to a skin film for uppers of shoes which is prevented from being polluted due to color transfer of dyes of a fabric material when the skin film with a colored layer is adhered on the fabric material by a general heat press and prevent that colors of the fabric material are transferred to the skin film even though a user uses shoes for a long time.

BACKGROUND OF THE INVENTION

As well-known, in the shoe industry fields, a method for manufacturing uppers of shoes using a hot melt film with no sewing has been widely used, and recently, various materials as ornaments for the uppers of shoes have been used.

Recently, skin materials made of polyvinyl chloride resin or polyurethane resin which are bonded with fabric have been widely used as the uppers of shoes. As an example, a technology of bonding fabric for the uppers of shoes to the top layer of a polyurethane film using a high-frequency fusing method after printing by a comma coater method, a screening method or a copying method has been widely used.

As described above, according to the conventional method, the uppers of shoes are manufactured through the no-sewing process. As materials for the uppers of shoes, as shown in FIG. 1, a polyurethane skin with colors is coated or a thermoplastic polyurethane (TPU) film 20 (hereinafter, called "TPU film 20") with colors is coextruded on a hot melt film 30 made of thermoplastic polyurethane so as to form a skin film 10 having at least two layers.

In order to use the skin film 10 as the uppers of shoes, the skin film 10 is put on a fabric material 40 which a user wants to bond, and then, is bonded to the fabric material 40 when the thermoplastic polyurethane hot melt film 30 which is the bottom surface of the skin film 10 melts by heat and pressure through the general heat press work, but the TPU film 20 with colors which is coated on the hot melt film 30 does not melt so as to decorate the uppers of shoes.

However, the conventional skin film 10 for the uppers of shoes cause color transfer that colors of the fabric material 40 are transferred to the skin film 10. In detail, as shown in FIG. 2, when the skin film 10 is bonded to the fabric material 40 through the no-sewing process, dyes (red dye in FIG. 2) used to dye the fabric material 40 change the color of the skin film 10, into orange color in FIG. 2, while being transferred toward the skin film 10 during heat press work. Therefore, the conventional skin film has several disadvantages in that bright colors cannot used, there are many limitations in selection of colors, and the color of the fabric material 40 is transferred toward the skin film 10 when the user uses the shoes for a long term so as to defile the appearance of the shoes.

SUMMARY OF THE INVENTION

Accordingly, the present invention has been made in view of the above-mentioned problems occurring in the prior art, and it is an object of the present invention to provide a skin film for uppers of shoes which can prevent dyes of a fabric material from being transferred to the skin film when the skin film is bonded to the fabric material.

To achieve the above objects, the present invention provides a skin film for uppers of shoes including: a hot melt film; a color transfer preventing film which is made of ethylene vinyl alcohol copolymer resin and is formed on the hot melt film; and a polyurethane film which is formed on the color transfer preventing film.

In another aspect of the present invention, the present invention provides a skin film for uppers of shoes including: a hot melt film for preventing color transfer which is processed by mixing thermoplastic polyurethane and ethylene vinyl alcohol copolymer resin; and a polyurethane film which is formed on the color transfer preventing hot melt film.

The skin film for the uppers of shoes according to the present invention is manufactured through the method that the EVOH film layer for preventing color transfer is formed between the TPU film and the hot melt film or through the method that EVOH resin is added when the hot melt film is manufactured, so that the EVOH film can prevent dyes of the fabric material from being transferred to the skin film when the skin film is bonded to the fabric material. Therefore, the skin film according to the present invention can prevent the colored layer of the skin film from being polluted and maintain various patterns and colors of the skin film as they are even though a user uses the shoes for a long time.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Figure 1:
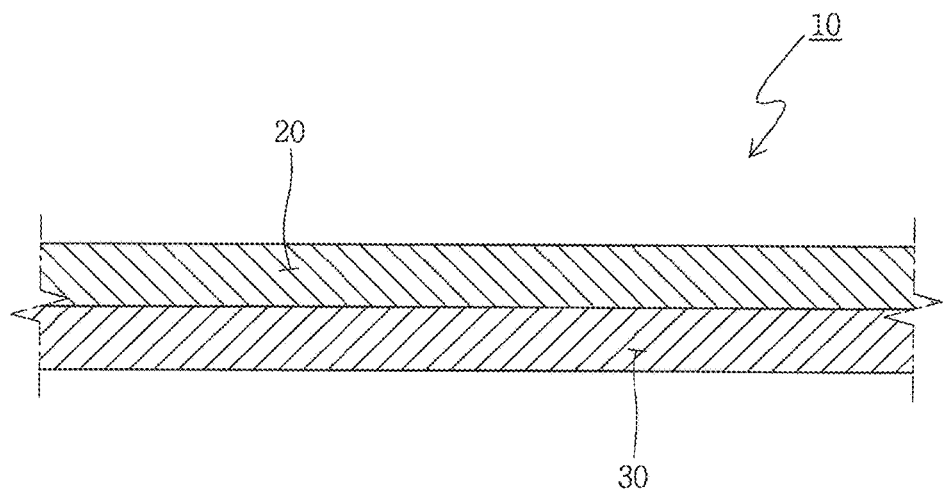
FIG. 1 is a view showing a structure of a skin film for uppers of shoes according to a prior art.
Figure 2:
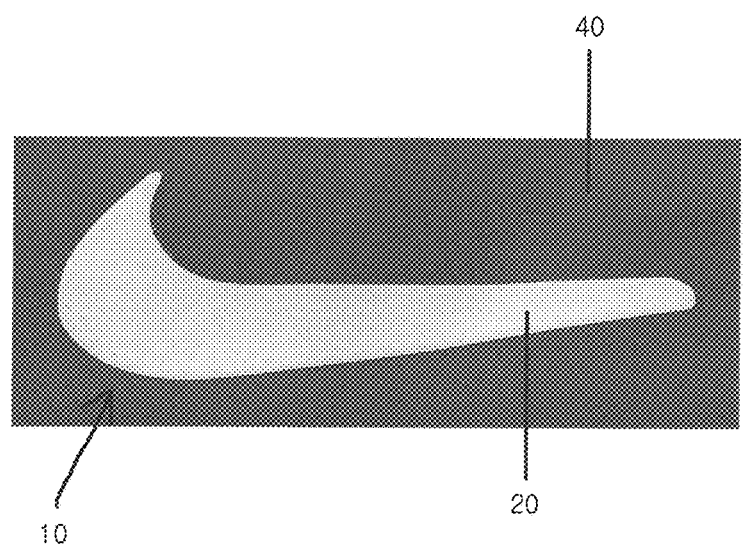
FIG. 2 is a view showing a state where dyes of a fabric material are transferred to a thermoplastic polyurethane (TPU) film to pollute a colored layer of the TPU film when the skin film is bonded to the fabric material.

Reference will be now made in detail to preferred embodiments of the disclosure with reference to the attached drawings. It will be understood that representative embodiments of the present invention will be proposed in the detailed description in order to achieve the technical objects and that other embodiments proposable in the present invention will be substituted with description of the present invention.

In the present invention, the terms, 'skin film' or 'skin film for uppers of shoes', mean a skin film which is a skin material used for the uppers of shoes and, in detail, mean a film that a thermoplastic polyurethane film or a polyurethane film is bonded to a general fabric material to be used as the uppers of shoes. That is, the skin film or the skin film for the uppers of shoes means the form that a thermoplastic polyurethane film or a polyurethane film which has a printed layer with various colors and patterns by the general printing method proposed in the present invention is dry-coated or coextruded on a thermoplastic polyurethane hot melt film. In this instance, the polyurethane skin is generally dry-coated on the hot melt film, and the thermoplastic polyurethane film is generally coextruded with the hot melt film by a T-die extruder.

In the present invention, the skin film for the uppers of shoes includes a polyurethane skin or a thermoplastic polyurethane film (hereinafter, called "TPU film") having a colored layer and a thermoplastic polyurethane hot melt film (hereinafter, called "hot melt film"). The skin film is manufactured when an ethylene vinyl alcohol copolymer (hereinafter, called "EVOH") is formed between the TPU film and the hot melt film. The skin film according to the present invention can prevent dyes of a fabric material from being transferred to the skin film when the skin film is bonded to the fabric material, thereby preventing pollution of the colored layer of the skin film.

Moreover, the present invention proposes a skin film for preventing color transfer which includes a hot melt film manufactured by mixing thermoplastic polyurethane and EVOH resin and a TPU film formed on the hot melt film.

The skin film is generally manufactured by two kinds of methods. In detail, preferably, the skin film is manufactured using a general T-die extruder or is manufactured by a method to coat the hot melt film with the EVOH resin film, namely, color transfer preventing film, and the TPU film in order through the dry-coating method.

The skin film for the uppers of shoes according to the present invention can prevent pollution of the colored layer because the color transfer preventing film prevents dyes of the fabric material from being transferred toward the skin film when the skin film is bonded to the fabric material by general heat press work. Furthermore, the skin film according to the present invention can prevent pollution of the colored layer because the EVOH resin contained in the hot melt film prevents dyes of the fabric material from being transferred toward the skin film during heat press work.

Hereinafter, the present invention will be described in detail in accordance with the preferred embodiments, but is not limited by the preferred embodiments.

Embodiment 1

Figure 3:
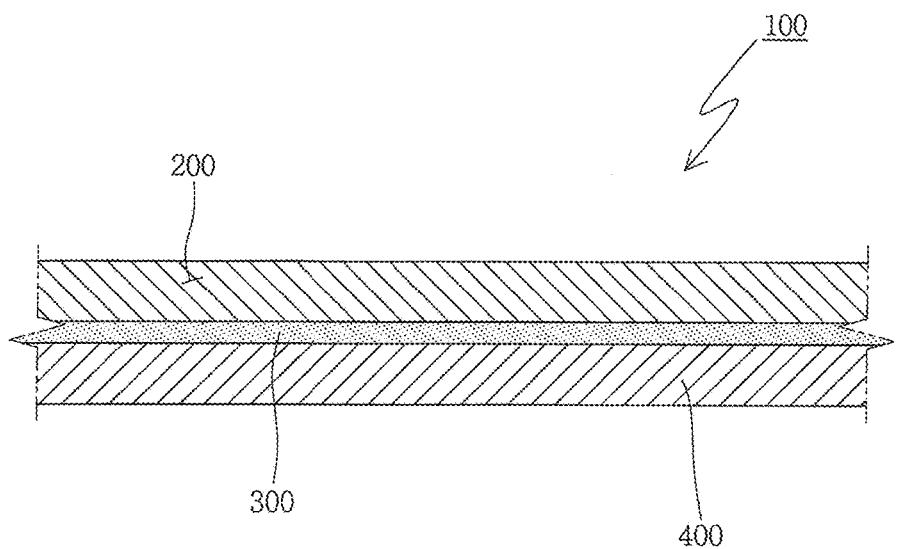
FIG. 3 is a view showing a structure of a skin film for the uppers of shoes to prevent color transfer according to a first preferred embodiment of the present invention.

FIG. 3 is a view showing a structure of a skin film for the uppers of shoes to prevent color transfer according to a first preferred embodiment of the present invention. The skin film 100 according to the first preferred embodiment of the present invention is manufactured by a coextrusion method or a dry-coating method. In detail, the skin film 100 is a triple-layered skin film and is 0.10 to 0.50 mm in total thickness.

Figure 5:
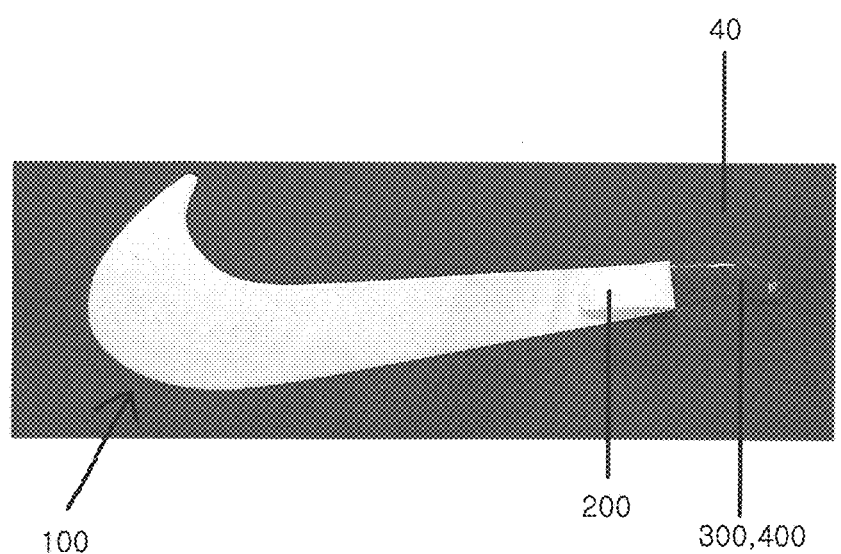
FIG. 5 is a view showing a clean state of a colored layer of a TPU film because dyes of a fabric material is not transferred to the TPU film when the skin film is bonded to the fabric material illustrated in FIG. 3.

Referring to FIG. 1, the skin film 100 according to the present invention includes: a hot melt film 400 which is made of thermoplastic polyurethane and becomes a bottom layer of the skin film; a color transfer preventing film 300 which is made of EVOH resin and formed on the hot melt film 400; and a TPU film 200 which is formed on the color transfer preventing film 300. The EVOH which is a copolymer between ethylene and vinyl alcohol is resin with superior gas-impermeability effect. When the EVOH film, namely, the color transfer preventing film 300, is formed between the hot melt film 400 and the TPU film 200, as shown in FIG. 5, the skin film can prevent the colored layer from being polluted because the color transfer preventing film 300 prevents the dyes of the fabric material 40 are transferred toward the TPU film 200 of the skin film during general heat press work. That is, the color transfer preventing film 300 of EVOH resin serves as a prevention film to prevent the dyes of the fabric material 40 from getting out of the fabric material and polluting the skin film 100 during heat press work.

Embodiment 2

Figure 4:
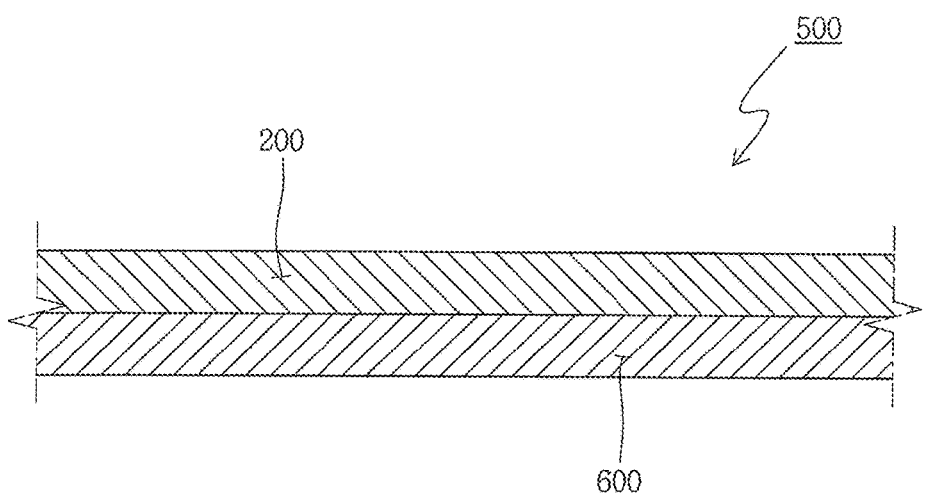
FIG. 4 is a view showing a structure of a skin film for the uppers of shoes to prevent color transfer according to a second preferred embodiment of the present invention.

FIG. 4 is a view showing a structure of a skin film for the uppers of shoes to prevent color transfer according to a second preferred embodiment of the present invention. The skin film 500 according to the second preferred embodiment of the present invention has a double-layered structure and is 0.10 to 0.50 mm in thickness. The skin film 500 is manufactured by the coextrusion method using a general T-die extruder or manufactured in the manner that a TPU film 20 is formed on a hot melt film 600 by the dry-coating method.

Referring to FIG. 4, the skin film 500 according to the present invention includes a TPU film 200 and a hot melt film 600. The TPU film 200 is manufactured of thermoplastic polyurethane, and the hot melt film 600 is manufactured by mixing thermoplastic polyurethane and EVOH resin together. That is, preferably, in order to manufacture the hot melt film 600, 5 to 95 wt % of thermoplastic polyurethane and 95 to 5 wt % of EVOH resin are mixed.

Also, the skin film 500 manufactured through the above method according to the second preferred embodiment of the present invention can prevent pollution of the colored layer because the EVOH contained in the hot melt film 600 prevents the dyes of the fabric material 40 are transferred toward the TPU film 200 during heat press work.

What is claimed is:
1. A skin film for coupling to colored fabric, the skin film consisting of:
   a hot melt film for coupling to the colored fabric by melting with application of heat and pressure;
   a color transfer preventing film of ethylene vinyl alcohol copolymer resin material, the color transfer preventing film formed on the hot melt film; and
   a polyurethane film formed on the color transfer preventing film as an outer non fabric skin layer of the skin film,
   wherein dyes of the colored fabric is prevented from transferring to the polyurethane film owing to the presence of the color transfer preventing film.
2. The skin film of claim 1, wherein the skin film is adapted to couple to colored fabric of a shoe.
3. The skin film of claim 1, wherein the hot melt film is thermoplastic polyurethane film.
4. A skin film for coupling to colored fabric, the skin film consisting of:
   a hot melt film for coupling to the colored fabric by melting with application of heat and pressure, the hot melt film formed of thermoplastic polyurethane and ethylene vinyl alcohol copolymer resin mixed together; and
   a polyurethane film formed on the hot melt film as an outer skin layer of the skin film, wherein dyes of the colored fabric is prevented from transferring to the polyurethane film owing to the presence of the ethylene vinyl alcohol copolymer resin mixed in the hot melt film.

5. The skin film of claim 4, wherein the skin film is adapted to couple to colored fabric of a shoe.

6. The skin film of claim 4, wherein the hot melt film is thermoplastic polyurethane film.

\* \* \* \* \*